United States Patent
Roberts (10) Patent No.: US 6,868,528 B2
(45) Date of Patent: Mar. 15, 2005

(54) SYSTEMS AND METHODS FOR CREATING AND DISPLAYING A USER INTERFACE FOR DISPLAYING HIERARCHICAL DATA

(75) Inventor: Scott Roberts, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 620 days.

(21) Appl. No.: 09/883,125

(22) Filed: Jun. 15, 2001

(65) Prior Publication Data

US 2002/0191033 A1 Dec. 19, 2002

(51) Int. Cl.[7] ............................................. G09G 5/00
(52) U.S. Cl. .................. 715/853; 715/854; 715/760; 705/26; 707/1; 707/7; 707/100; 707/102
(58) Field of Search ............................. 345/853–854, 345/780, 809, 841, 760; 705/26; 715/513–515, 835, 503; 707/1–5, 7, 100, 102

(56) References Cited

U.S. PATENT DOCUMENTS

| | | | | |
|---|---|---|---|---|
| 5,485,567 A | * | 1/1996 | Banning et al. | 707/4 |
| 5,701,137 A | * | 12/1997 | Kiernan et al. | 345/853 |
| 5,974,407 A | * | 10/1999 | Sacks | 707/2 |
| 5,974,532 A | * | 10/1999 | McLain et al. | 712/208 |
| 6,189,012 B1 | * | 2/2001 | Mital et al. | 707/103 R |
| 6,336,124 B1 | * | 1/2002 | Alam et al. | 715/523 |
| 6,381,600 B1 | * | 4/2002 | Lau | 707/6 |
| 6,519,588 B1 | * | 2/2003 | Leschner | 707/3 |
| 6,563,522 B1 | * | 5/2003 | Rosen et al. | 345/854 |
| 6,581,062 B1 | * | 6/2003 | Draper et al. | 707/100 |
| 6,613,098 B1 | * | 9/2003 | Sorge et al. | 715/503 |

* cited by examiner

*Primary Examiner*—Raymond J. Bayerl
*Assistant Examiner*—Cuong T. Thai
(74) *Attorney, Agent, or Firm*—Lee & Hayes, PLLC (57) ABSTRACT

A graphical user interface for displaying hierarchical data, such as extensible markup language (XML) data, in hypertext markup language (HTML) format in a convenient and efficient manner. For data having subordinate data, an actuatable subordinate data indicator is displayed on the user interface. When actuated, the subordinate data is displayed in a similar format as the parent data. Two methods are described for building the tables. A first method initially parses all the data and builds the necessary tables for display. A second method initially parses only the top level of data and then builds subordinate tables as they are requested by a user.

37 Claims, 6 Drawing Sheets

Fig. 1

| Customer ID | Company Name | Contact | Address | Phone | Orders | Order Details | Cust. Details |
|---|---|---|---|---|---|---|---|
| 3C146HD | ***** | **** | **** | **** | ▷ | | ▷ |
| 7A654LD | ***** | **** | **** | **** | ▷ | | |
| ***** | ***** | **** | **** | **** | ▷ | ▷ | |
| ***** | ***** | **** | **** | **** | ▷ | ▷ | ▷ |
| ***** | ***** | **** | **** | **** | ▷ | | |
| ***** | ***** | **** | **** | **** | ▷ | ▷ | ▷ |
| ***** | ***** | **** | **** | **** | ▷ | ▷ | |
| ***** | ***** | **** | **** | **** | ▷ | ▷ | ▷ |
| ***** | ***** | **** | **** | **** | ▷ | | |
| ***** | ***** | **** | **** | **** | ▷ | | |

Fig. 2

| Customer ID | Company Name | Contact | Address | Phone | Orders | Order Details | Cust. Details |
|---|---|---|---|---|---|---|---|
| 3C146HD | ***** | **** | **** | **** | ▷ | ▷ | ▷ |

| Order Identifier | Order Date | Required | Shipped | Details |
|---|---|---|---|---|
| ***** | **** | **** | **** | ▷ |
| ***** | **** | **** | **** | ▷ |
| ***** | **** | **** | **** | |
| ***** | **** | **** | **** | |
| ***** | **** | **** | **** | ▷ |
| ***** | **** | **** | **** | ▷ |
| ***** | **** | **** | **** | ▷ |

SYSTEMS AND METHODS FOR CREATING AND DISPLAYING A USER INTERFACE FOR DISPLAYING HIERARCHICAL DATA

TECHNICAL FIELD

The systems and methods described herein relate generally to graphical user interfaces for computing systems and, more particularly, user interfaces for displaying hierarchical data (such as extensible markup language (XML) data) in hypertext markup language (HTML).

BACKGROUND

Extensible markup language (XML) is a more recent of a line of several evolutions of a general markup language that was invented years ago as a common style sheet for technical reports. From this general markup language evolved hypertext markup language (HTML) that made possible the World Wide Web.

Before XML, markup languages focused on describing the layout for a page, typically on computer screens. The layout defined such things as text fonts, text location, image location, background color, etc. Web pages written in HTML can be rendered by any web browser application running on almost any kind of computer. The web page will look and function virtually identically without regard for the computing environment.

However, HTML has no way of "knowing" the meaning of the data that it displays. It is only capable of describing how the Web page will look and function and what text it will contain. While HTML knows a great deal about words, it knows nothing at all about information.

On the other hand, XML differs from those markup languages in that XML focuses on describing data, not pages. Hence, XML makes applications aware of what the application are about. XML makes Web pages intelligent. For example, a spreadsheet application written with XML can link across the Internet into other spreadsheets and into server-based applications that offer even greater power.

XML introduced the concept of metadata, i.e., data about data. In XML, each piece of data not only includes the data itself but also a description of the data, what it means. An XML database can have a list of names (data) and a tag on the data saying that the names are customer names (metadata). An XML search engine does not have to pull in all the data and analyze the data to find a list of customer names, it simply queries the metadata to find tags indicating that the names are customer names and only that data has to be retrieved.

XML data is hierarchical. In other words, there are different levels of data, some levels subordinate to others. For example, an XML document may contain a first level of data items wherein each data item is a customer name. Each first-level data item (customer name) may have several attributes (contained in fields) and/or one or more second-level, or subordinate, data items. In the example where the first-level data items are customer names, each customer name may have second-level data items that comprise customer orders. The second-level data items may, in turn, have subordinate data levels (third-level data items). In the example described, the second-level data items (customer orders) may have subordinate data items, e.g., order details, and so on.

Despite all the advantages that accompany XML, XML cannot format data. Therefore, a formatting language must still be utilized to display XML data. Providing an efficient way to display XML—or, in fact, any hierarchical data—using HTML is an important goal to assist application developers and users of XML-based applications.

SUMMARY

A graphical user interface for displaying hierarchical data—such as extensible markup language (XML) data—in hypertext markup language (HTML) is described that includes an actuatable subordinate data indicator that, when actuated, causes data that is subordinate to the displayed data to be displayed.

Methods are described for parsing the hierarchical data to build the display. One method requires that the complete data be initially parsed to build hierarchical tables that may be displayed on command. Another method describes building the tables on demand, so that only the data that is requested to be viewed must have a table built to display the requested data.

DETAILED DESCRIPTION

Figure 1:
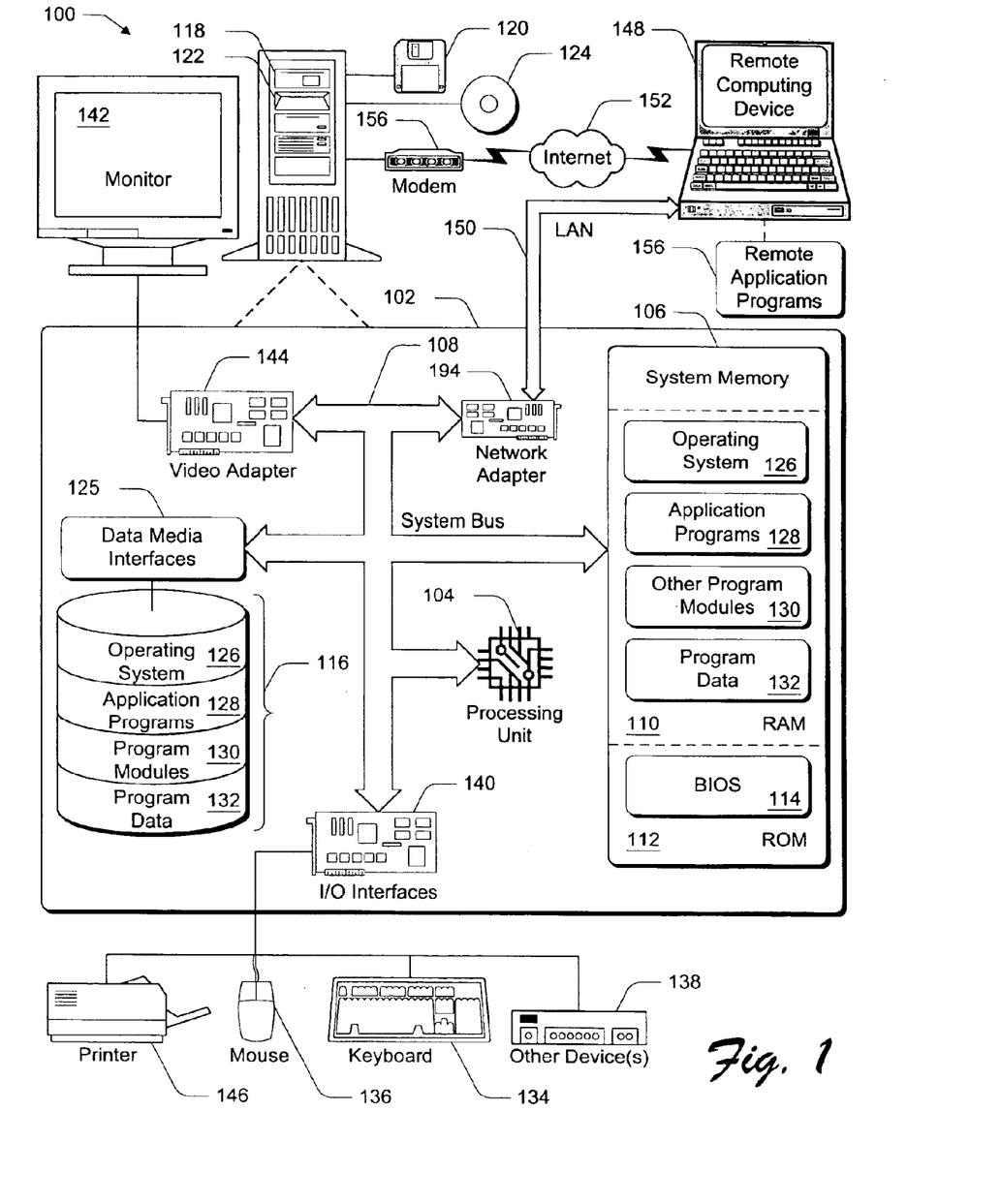
FIG. 1 is a block diagram of an exemplary computer system on which the described invention may be implemented.

FIG. 1 illustrates an example of a suitable computing environment 100 within which a centralized alert delivery system as described herein, may be implemented (either fully or partially). The computing environment 100 may be utilized in the computer and network architectures described herein.

The exemplary computing environment 100 is only one example of a computing environment and is not intended to suggest any limitation as to the scope of use or functionality of the computer and network architectures. Neither should the computing environment 100 be interpreted as having any dependency or requirement relating to any one or combination of components illustrated in the exemplary computing environment 100.

The centralized alert delivery system may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The centralized alert delivery system may be described in the general context of computer-executable instructions, such as program modules, being executed by a computer. Generally, program modules include routines, programs, objects, components, data structures, etc. that perform particular tasks or implement particular abstract data types. The centralized alert delivery system may also be practiced in distributed computing environments where tasks are performed by remote processing devices that are linked through a communications network. In a distributed computing environment, program modules may be located in both local and remote computer storage media including memory storage devices.

The computing environment 100 includes a general-purpose computing device in the form of a computer 102. The components of computer 102 can include, by are not limited to, one or more processors or processing units 104, a system memory 106, and a system bus 108 that couples various system components including the processor 104 to the system memory 106.

The system bus 108 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 102 typically includes a variety of computer readable media. Such media can be any available media that is accessible by computer 102 and includes both volatile and non-volatile media, removable and non-removable media.

The system memory 106 includes computer readable media in the form of volatile memory, such as random access memory (RAM) 110, and/or non-volatile memory, such as read only memory (ROM) 112. A basic input/output system (BIOS) 114, containing the basic routines that help to transfer information between elements within computer 102, such as during start-up, is stored in ROM 112. RAM 110 typically contains data and/or program modules that are immediately accessible to and/or presently operated on by the processing unit 104.

Computer 102 may also include other removable/non-removable, volatile/non-volatile computer storage media. By way of example, FIG. 1 illustrates a hard disk drive 116 for reading from and writing to a non-removable, non-volatile magnetic media (not shown), a magnetic disk drive 118 for reading from and writing to a removable, non-volatile magnetic disk 120 (e.g., a "floppy disk"), and an optical disk drive 122 for reading from and/or writing to a removable, non-volatile optical disk 124 such as a CD-ROM, DVD-ROM, or other optical media. The hard disk drive 116, magnetic disk drive 118, and optical disk drive 122 are each connected to the system bus 108 by one or more data media interfaces 126. Alternatively, the hard disk drive 116, magnetic disk drive 118, and optical disk drive 122 can be connected to the system bus 108 by one or more interfaces (not shown).

The disk drives and their associated computer-readable media provide non-volatile storage of computer readable instructions, data structures, program modules, and other data for computer 102. Although the example illustrates a hard disk 116, a removable magnetic disk 120, and a removable optical disk 124, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 116, magnetic disk 120, optical disk 124, ROM 112, and/or RAM 110, including by way of example, an operating system 126, one or more application programs 128, other program modules 110, and program data 132. Each of such operating system 126, one or more application programs 128, other program modules 130, and program data 132 (or some combination thereof) may include an embodiment of a communications layer and a subscription layer of the centralized alert delivery system.

A user can enter commands and information into computer 102 via input devices such as a keyboard 134 and a pointing device 136 (e.g., a "mouse"). Other input devices 138 (not shown specifically) may include a microphone, joystick, game pad, satellite dish, serial port, scanner, and/or the like. These and other input devices are connected to the processing unit 104 via input/output interfaces 140 that are coupled to the system bus 108, but may be connected by other interface and bus structures, such as a parallel port, game port, or a universal serial bus (USB).

A monitor 142 or other type of display device can also be connected to the system bus 108 via an interface, such as a video adapter 144. In addition to the monitor 142, other output peripheral devices can include components such as speakers (not shown) and a printer 146 which can be connected to computer 102 via the input/output interfaces 140.

Computer 102 can operate in a networked environment using logical connections to one or more remote computers, such as a remote computing device 148. By way of example, the remote computing device 148 can be a personal computer, portable computer, a server, a router, a network computer, a peer device or other common network node, and the like. The remote computing device 148 is illustrated as a portable computer that can include many or all of the elements and features described herein relative to computer 102.

Logical connections between computer 102 and the remote computer 148 are depicted as a local area network (LAN) 150 and a general wide area network (WAN) 152. Such networking environments are commonplace in offices, enterprise-wide computer networks, intranets, and the Internet.

When implemented in a LAN networking environment, the computer 102 is connected to a local network 150 via a network interface or adapter 154. When implemented in a WAN networking environment, the computer 102 typically includes a modem 156 or other means for establishing communications over the wide network 152. The modem 156, which can be internal or external to computer 102, can be connected to the system bus 108 via the input/output interfaces 140 or other appropriate mechanisms. It is to be appreciated that the illustrated network connections are exemplary and that other means of establishing communication link(s) between the computers 102 and 148 can be employed.

In a networked environment, such as that illustrated with computing environment 100, program modules depicted relative to the computer 102, or options thereof, may be stored in a remote memory storage device. By way of example, remote application programs 158 reside on a memory device of remote computer 148. For purposes of illustration, application programs and other executable program components such as the operating system are illustrated herein as discrete blocks, although it is recognized that such programs and components reside at various times in different storage components of the computing device 102, and are executed by the data processor(s) of the computer.

Computer-Executable Instructions

An implementation of a user interface for displaying hierarchical data may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 1 illustrates an example of a suitable operating environment 100 in which a user interface for displaying hierarchical data may be implemented. Specifically, the centralized alert delivery system(s) described herein may be implemented wholly or in part by any program modules 128–130 and/or operating system 128 in FIG. 1 or a portion thereof.

The operating environment is only an example of a suitable operating environment and is not intended to suggest any limitation as to the scope or use of functionality of the centralized alert delivery system(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of a user interface for displaying hierarchical data may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Graphical User Interface: First-Level Data Items

Figure 2:
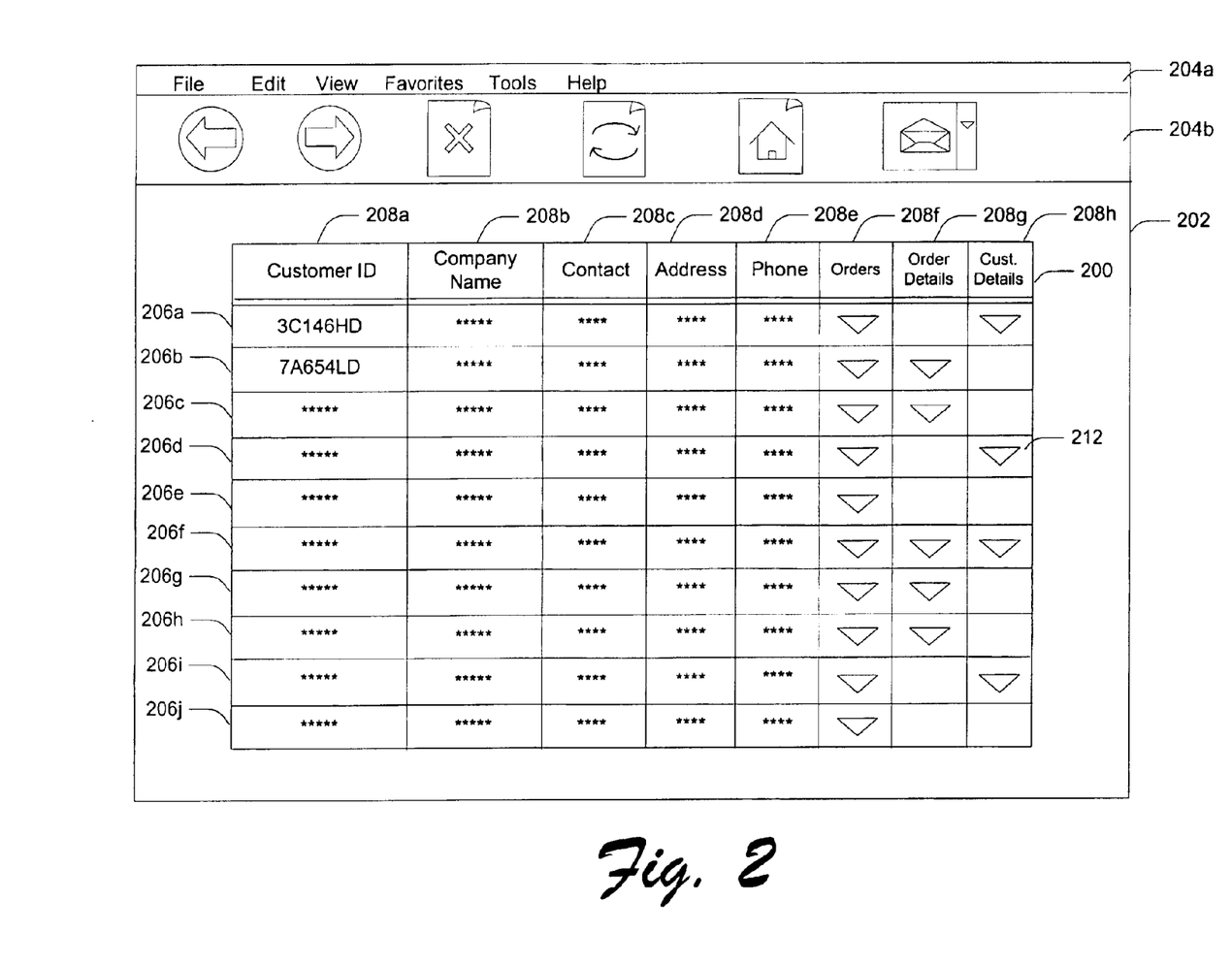
FIG. 2 is an illustration of an example display showing first-level data items.

FIG. 2 is an illustration of an exemplary graphical user interface 200 for displaying first-level data items in a hierarchical data set. The user interface 200 is displayed on a computer monitor screen 202. Also shown on the screen 202 are a first toolbar 204*a* and a second toolbar 204*b* similar to those typically displayed by a Web browser.

The graphical user interface 200 includes several rows 206*a*–206*j* and columns 208*a*–208*h*. Each of the rows 206*a*–206*j* represents a first level of data items in a hierarchical data set, such as an XML document. Each column 208*a*–208*h* includes a heading in a heading row 210. The headings row 210 includes the heading, respectively, of customer ID (column 208*a*), company name (column 208*b*), contact (208*c*), address (208*d*), phone (208*e*), orders (208*f*), order details (208*g*) and customer details (208*h*). For the present example, most of the contents of the data items are irrelevant. However, for purposes of the following discussion, the customer id of a customer identified in row 206*a*, column 208*a* is 3C146HD and the customer id of a customer identified in row 206*b*, column 208*a* is 7A654LD.

Columns 208*f* (orders), 208*g* (order details) and 208*h* (customer details) include—in some rows—a subordinate data indicator 212. The subordinate data indicator 212 is an actuatable icon that, when actuated, displays a subordinate level of data in the hierarchical data set. In the present example, a subordinate data indicator 212 is displayed in each row 206*a*–206*j* of column 208*f* (orders). This indicates that there is data regarding orders for each of the customers indicated in column 208*a*–208*h*. As will be discussed in greater detail, below, if any of the subordinate data indicators in column 208*f* is actuated, then a second level of data will be displayed for the orders associated with the customer identified in the row 206*a*–206*j* in which the subordinate data indicator 212 that was actuated is located.

If there is no subordinate data associated with a first-level data item, then no subordinate data indicator corresponding to the first-level data item is shown. For example, for customer 3C146HD, there are no order details because no subordinate data indicator 212 is shown in column 208*g* (order details). However, there are customer details associated with customer 3C146HD because a subordinate data indicator 212 is shown in column 208*h* (customer details) associated with that customer.

Similarly, for customer 7A654LD, there is subordinate data for orders (column 208*f*) and order details (column 208*g*), but there is no subordinate data for customer details (208*h*). This can be seen by the presence or absence of a subordinate data indicator 212 in the aforementioned columns.

Graphical User Interface: Second-Level Data Items

Figure 3:
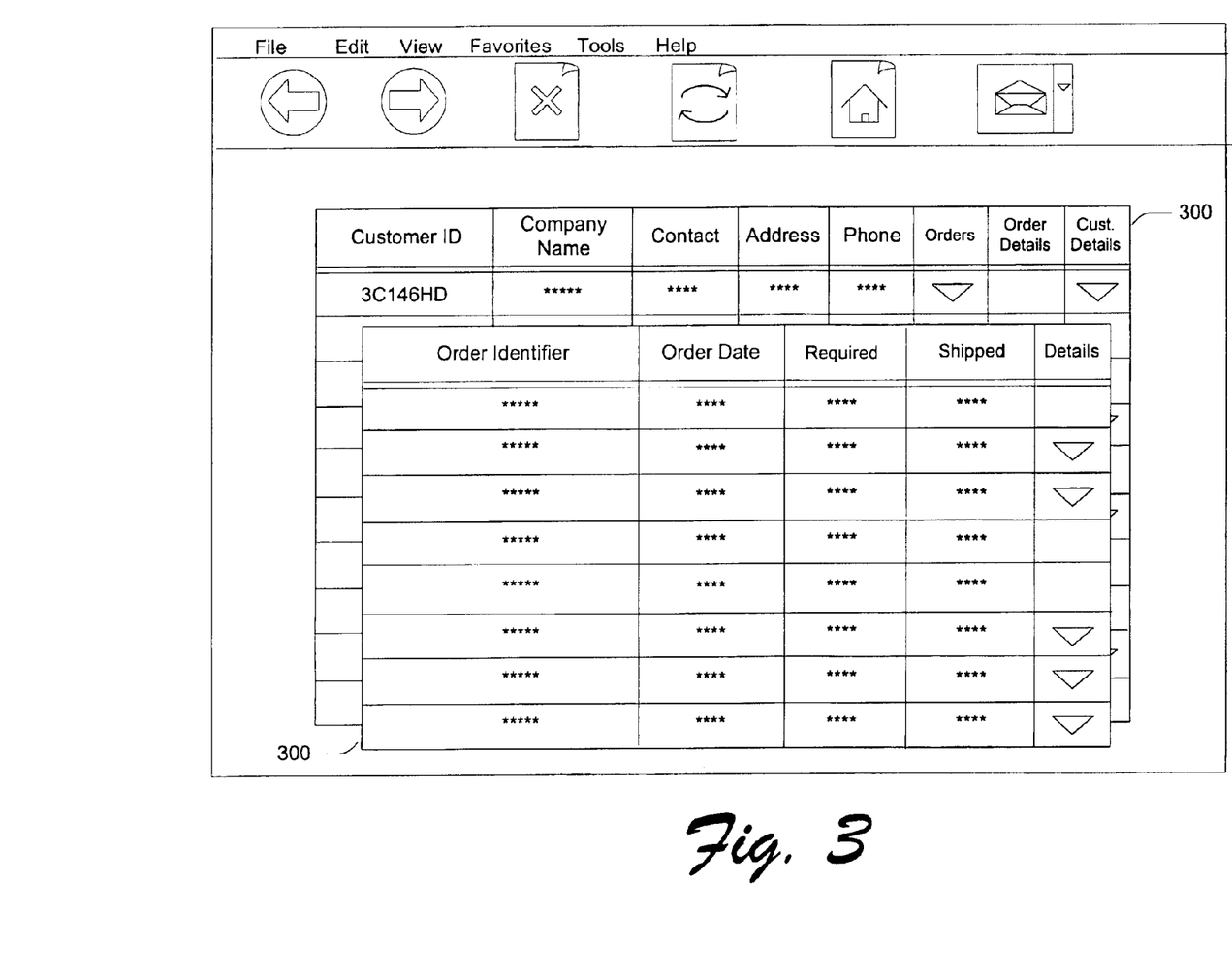
FIG. 3 is an illustration of an example display showing second-level data items.

FIG. 3 is an illustration of the graphical user interface 200 shown in FIG. 2 after a subordinate data indicator 212 has been actuated in the orders column (208f) for the customer identified in row 206a (customer id 3C146HD). The second-level data is displayed in a table 300 similar to the first-level data, although it should be noted that subordinate level data items may be displayed in a different format that the format in which the first-level data items are displayed.

The table 300 includes several rows (302) and columns (304), the intersection of which forms fields. A field may contain a subordinate data indicator 212 similar to the subordinate data indicators 212 shown in FIG. 2. In this example, the only column 304 that may include a subordinate data indicator 212 is entitled "Details" (column 306). As previously discussed, if the subordinate data indicator 212 is shown in a row in column 306, then the second-level data item in the row associated with the column in which the subordinate data indicator 212 appears has subordinate—or, third-level—data items.

Graphical User Interface: Third-Level Data Items

Figure 4:
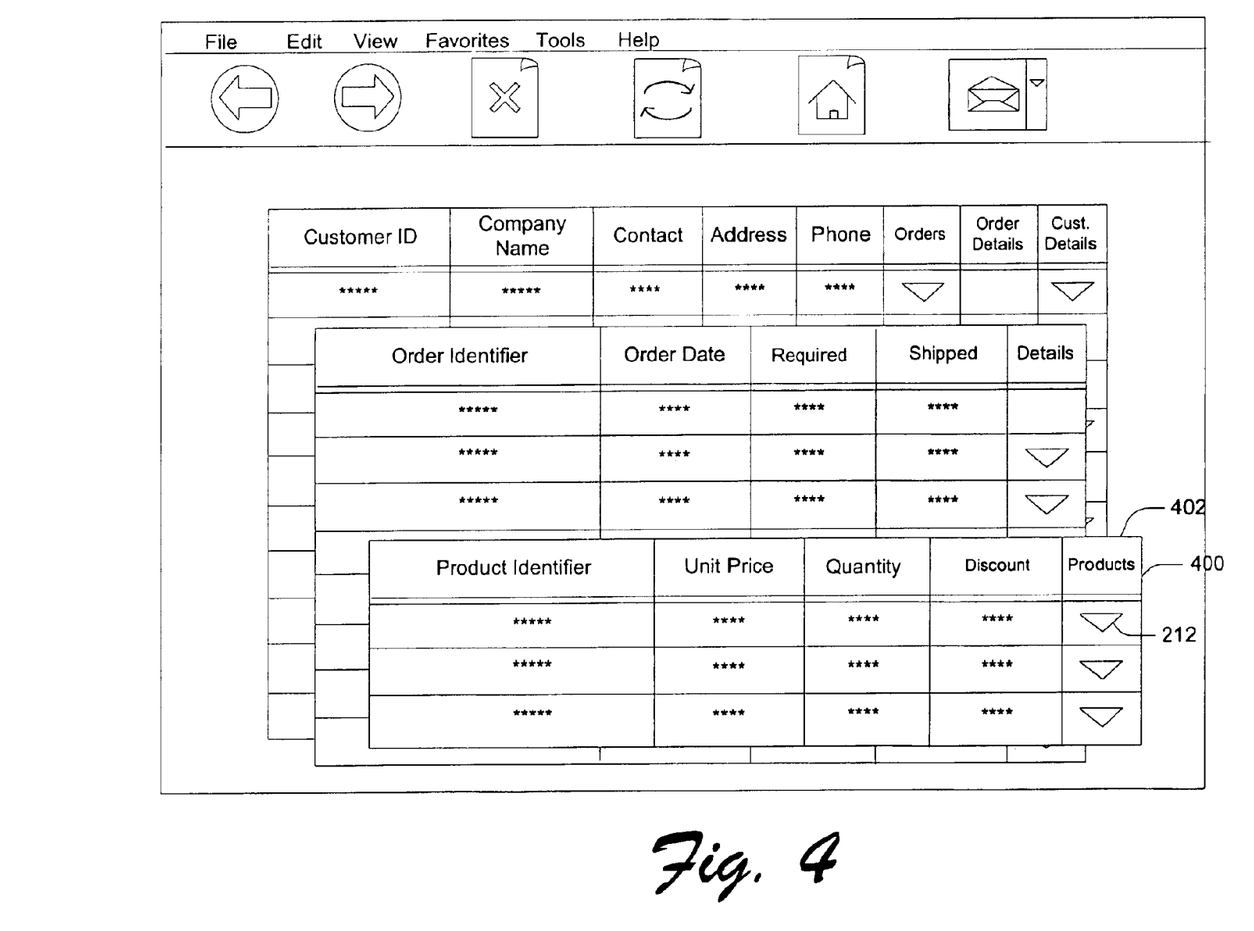
FIG. 4 is an illustration of an example display showing third-level data items.

FIG. 4 is an illustration of the graphical user interface 200 shown in FIGS. 2 and 3 after a subordinate data indicator 212 has been actuated in the "details" column (306) of table 300. Third-level data items are displayed in a table 400 that is similar to the table 300 shown in FIG. 3. Again, the table 400 includes at least one column 402 that may include a subordinate data indicator 212 The subordinate data indicator 212 may be actuated to display subordinate (fourth-level) data items.

It is noted that table 300 in FIG. 3 and table 400 in FIG. 4 are displayed in a position so that the actuated subordinate data indicator 212 that was actuated to display the table 300, 400 and the row associated with the actuated subordinate data indicator 212 remains visible. This is not required to implement the described user interface, but it can be a convenience for a user.

Recursive Method for Building Display Tables

Figure 5:
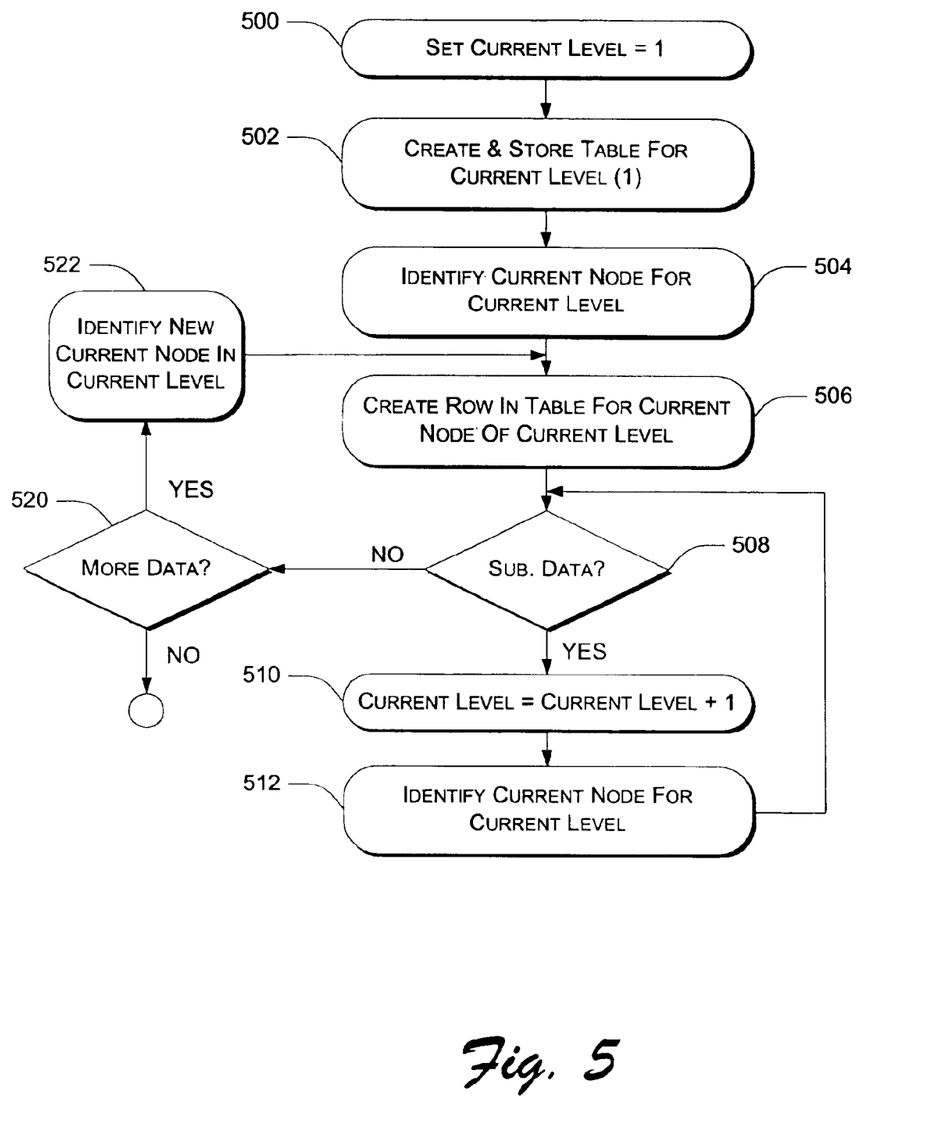
FIG. 5 is a flow diagram depicting a recursive method for building a display from hierarchical data.

To build HTML pages from XML data, an extensible style language (XSL) or extensible style (or stylesheet) language transformation (XSLT) script must be created. FIG. 5 is a flow diagram of a method that may be used to create the user interface described herein for display. Those skilled in the art will recognize that the steps described in FIG. 5 can be accomplished via an XSL or XSLT script, although the details of such a script will not be discussed herein.

The method outlined in FIG. 5 is a recursive method that is used to parse the entire hierarchical data set and build tables (or some other data structure) for displaying the data in the data set. At block 500, a current level of data is identified and initially set to 1 (indicating a first level of data in the hierarchical data set). A table representing the first level of data is created and stored at block 502.

At block 504, a current node (or data item) in the current level is identified. A row is created in the table representing the first level of data for the current node (block 506). At block 508, it is determined whether the current node has subordinate (child) data associated with it. If there is no subordinate data ("No" branch, block 508), then it is determined if there is more data to be parsed (block 520). If there is more data ("Yes" branch, block 520), then a new, or next, node (data item) in the current level is identified. Again at block 506, a row is created in the table representing the first level of data for the new current node.

If the new current node has subordinate data associated with it ("Yes" branch, block 508), then the current level is set to the current level plus one (block 510), i.e., the second level of data in the hierarchical data. A current node for the new current level is identified at block 512 and the process then reverts to block 508 to determine if the current node has subordinate data associated with it. This process continues recursively until the bottom level of data is reached. After all the data items have been parsed and there is no more data ("No" branch, block 520), then the process terminates and a complete representation of the hierarchical data is now stored in memory.

It is noted that this recursive method works well for "flat" data that does not have a large number of levels in it, or for data that has relatively few data items, e.g., less than one thousand data items. For deep or more extensive data, a "build on demand" method may be more appropriate for the situation. Such a method is described below with reference to FIG. 6.

Dynamic Nested Table Creation Method for Building Display Tables

Figure 6:
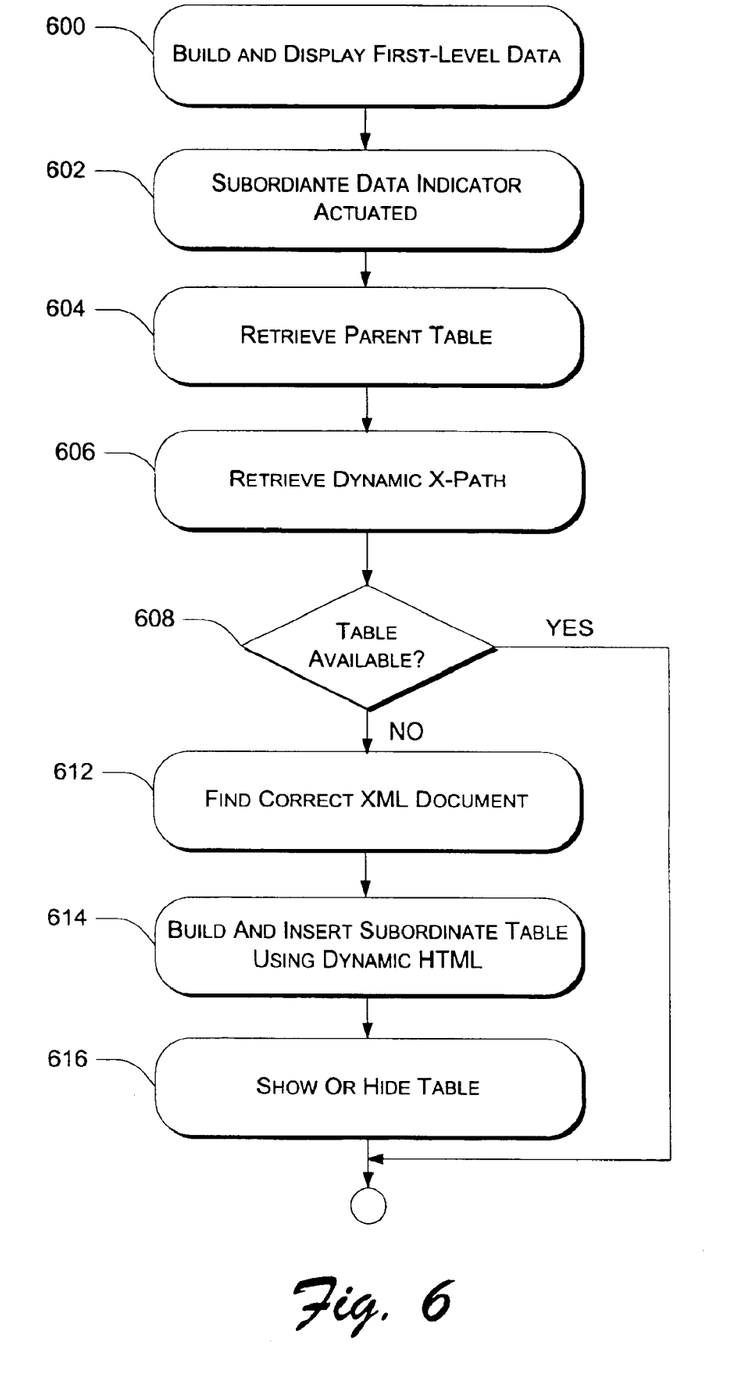
FIG. 6 is a flow diagram depicting a dynamic nested table creation method for building a display from hierarchical data.

FIG. 6 is a flow diagram depicting a method for building the graphical user interface depicted in FIGS. 2–4. The described method does not initially parse all of the data in the hierarchical (XML) data set. In the method described in FIG. 6, the subordinate data displays are created only upon demand by a user. For example, if the initial user interface (200, FIG. 2) is displayed, only the first-level data items have been parsed. When a subordinate data indicator 212 is actuated, the second-level data items are parsed and the second-level table 300 is built and displayed.

To accomplish the dynamic creation of tables, dynamic X-paths are used to keep track of previous data. X-paths are an XML concept that provide a way to find data. If a level of data items has been previously accessed, a dynamic X-path is stored that keeps track of that level of data items. When a subordinate data level is accessed, a table (or other type of display) is built and displayed. The subordinate data level is appended to the dynamic X-path so that the data items in that data level can be easily located the next time they are required.

At block 600, the first-level—or parent—table is built and displayed by parsing the first-level data items of the hierarchical data set. This may be accomplished using a non-recursive version of the algorithm previously discussed in relation to FIG. 5. When a subordinate data indicator is actuated (block 602), the parent table is retrieved using the dynamic X-path. A dynamic X-path associated with the parent table is retrieved at block 604. From the dynamic X-path, it can be determined if the subordinate data level has been previously access and, therefore, parsed and displayed. If the subordinate data level has been previously accessed ("Yes" branch, block 608), then the previously built table is displayed or hidden at block 616.

If the subordinate data level has not been previously accessed ("No" branch, block 608), then the subordinate data level data items are accessed utilizing the dynamic X-path associated with the hierarchical data set at block 612. A table (or some other display format) is built (block 614). After the table is built, the table is displayed at block 616.

By parsing the data and building the displays in this manner, large data sets can be parsed and displayed more efficiently than if the data is initially parsed prior to the initial display.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A user interface for displaying hierarchical data, comprising:

a first-level display for displaying one or more first-level data items in the hierarchical data, the hierarchical data being expressed by a markup language;

at least one field associated with each first-level data item, each field configured to display a first-level data sub-item or a subordinate data indicator, the first-level data sub-item being associated with the first level data item in the at least one field; and wherein the presence of the subordinate data indicator in a field indicates that the field has subordinate data associated with the field, the subordinate data being subordinate to the first-level data items in the hierarchical data.

2. The user interface as recited in claim 1, wherein the subordinate data further comprises one or more second-level data items in the hierarchical data.

3. The user interface as recited in claim 1, wherein the subordinate data indicator is an actuatable icon that, when actuated, displays the subordinate data.

4. The user interface as recited in claim 3, wherein the subordinate data, when displayed, is displayed in a format similar to a format in which the first-level data is displayed.

5. The user interface as recited in claim 3, wherein the subordinate data, when displayed, is displayed so that the first-level data associated with the subordinate data indicator is still visible on the display.

6. The user interface as recited in claim 1, wherein the hierarchical data further comprises extensible markup language (XML) data.

7. The user interface as recited in claim 1, wherein:

the first-level display is in a table format having rows and columns;

each row represents a first-level data item; and each column represents a field.

8. A graphical user interface, comprising:

a first table that displays first-level data items in hierarchical data being expressed by a markup language, the first table having a row for each first-level data item and one or more columns, each column representing a first-level data sub-item associated with the first-level data item of a corresponding row;

a second table that displays second-level data items in the hierarchical data, the second table having a row for each second-level data item and one or more columns, each column representing a second-level data sub-item associated with the second-level data item of a corresponding row; and an actuatable first-level subordinate data indicator displayable in a column of a row in the first table that, when actuated, causes at least a portion of the second table to be displayed.

9. The graphical user interface as recited in claim 8, wherein the first-level subordinate data indicator is only displayed when there is subordinate data associated with the first-level data sub-item associated with the row and column in which the first-level subordinate data indicator is displayed.

10. The graphical user interface as recited in claim 8, wherein the row of the first table that contains the actuated subordinate data indicator is visible on the interface when the second table is displayed.

11. The graphical user interface as recited in claim 8, further comprising:

a third table that displays third-level data items in the hierarchical data, the third table having a row for each third-level data item and one or more columns, each column representing a third-level data sub-item associated with the third-level data item of a corresponding row; and an actuatable second-level subordinate data indicator displayable in a column of a row in the second table that, when actuated, causes at least a portion of the third table to be displayed.

12. The graphical user interface as recited in claim 11, wherein the row of the second table that contains the second-level subordinate data indicator is visible when the third table is displayed.

13. The graphical user interface as recited in claim 8, wherein the hierarchical data is extensible markup language (XML) data.

14. One or more computer-readable media containing computer-executable instructions that, when executed on a computer, perform the following steps:

displaying one or more first-level data items included in a hierarchical data set, the hierarchical data set being expressed by a markup language;

displaying at least one field associated with each first-level data item, each field configured to display a first-level data sub-item associated with the first-level data item;

displaying a subordinate data indicator in a field if the field in which the subordinate data indicator has subordinate data associated with the field that is subordinate to the first-level data items in the hierarchical data.

15. The one or more computer-readable media as recited in claim 14, wherein the hierarchical data set is an extensible markup language (XML) data set.

16. The one or more computer-readable media as recited in claim 14, wherein the subordinate data indicator is actuatable and computer-executable instructions further display the subordinate data when the subordinate data indicator is actuated.

17. The one or more computer-readable media as recited in claim 16, wherein the data item associated with the subordinate data indicator and the fields associated with the data item are visible when the subordinate data is displayed.

18. The one or more computer-readable media as recited in claim 14, further comprising:

displaying a table having rows and columns;

wherein the first-level data items are each displayed in a row of the table; and wherein the first-level sub-items are each displayed in a column of the table, the column in which a first-level sub-item is displayed being associated with a row that is associated with a first-level data item that corresponds to the first-level sub-item.

19. The one or more computer-readable media as recited in claim 14, wherein the subordinate data further comprises one or more second-level data items in the hierarchical data.

20. The one or more computer-readable media as recited in claim 19, wherein:

the first-level data items, the first-level data sub-items and the data indicator are displayed in a first format; and the subordinate data is displayed in the first format.

21. The one or more computer-readable media as recited in claim 19, wherein:

the first-level data items, the first-level data sub-items and the data indicator are displayed in a first format; and the subordinate data is displayed in a second format.

22. One or more computer-readable media containing computer-executable instructions that, when executed on a computer, perform the following steps:

displaying a first table that shows one or more first-level data items included in a hierarchical data set, the hierarchical data set being expressed by a markup language, the first table having a row corresponding to each first-level data item and one or more columns that each correspond to a first-level data sub-item associated with the first-level data item of a corresponding row;

displaying at least a portion of a second table that shows one or more second-level data items in the hierarchical data set, the second table having a row corresponding to each second-level data item and one or more columns that each correspond to a second-level data sub-item associated with the second-level data item of a corresponding row;

displaying one or more actuatable subordinate data icons, each in a column of a row in the first table that, when actuated, causes at least a portion of the second table to be displayed; and wherein the actuatable subordinate data icon is only displayed if there is second-level data that corresponds with the first-level data sub-item associated with the column in which the actuatable subordinate data icon is displayed.

23. The one or more computer-readable media as recited in claim 22, wherein a row in the first table that contains the actuated subordinate data icon remains visible after the second table is displayed.

24. The one or more computer-readable media as recited in claim 22, further comprising computer-executable instructions that, when executed on a computer, perform the following steps:

displaying at least a portion of a third table that shows one or more third-level data items in the hierarchical data set, the third table having a row corresponding to each third-level data item and one or more columns that each correspond to a third-level data sub-item associated with the third-level data item of a corresponding row;

displaying one or more actuatable subordinate data icons in the second table, each in a column of a row in the second table that, when actuated, causes at least a portion of the third table to be displayed; and wherein the actuatable subordinate data icon is only displayed in the second table if there is third-level data that corresponds with the second-level data sub-item associated with the column in which the actuatable subordinate data icon is displayed.

25. The one or more computer-readable media as recited in claim 24, wherein a row in the second table that contains the actuated subordinate data icon remains visible after the third table is displayed.

26. A method for displaying hierarchical data in hypertext markup language (HTML), comprising:

traversing the hierarchical data, the hierarchical data being expressed by a markup language;

building a visual representation for each level of the hierarchical data in HTML;

storing the visual representations;

displaying the visual representation for at least a first level of the hierarchical data; and displaying an actuatable subordinate data indicator that, when actuated, displays a second level of the hierarchical data, the second level of the hierarchical data being subordinate to the first level of the hierarchical data.

27. The method as recited in claim 26, wherein the at least a first level of the hierarchical data further comprises a top level of the hierarchical data.

28. The method as recited in claim 26, wherein the traversing the hierarchical data further comprises traversing the hierarchical data in a depth-first manner.

29. The method as recited in claim 26, wherein the visual displays are built for all of the hierarchical data before any of the displays are displayed.

30. The method as recited in claim 26, further comprising:

displaying the visual representation for at least a second level of the hierarchical data; and displaying a second-level actuatable subordinate data indicator that, when actuated, displays a third level of the hierarchical data, the third level of the hierarchical data being subordinate to the second level of the hierarchical data.

31. The method as recited in claim 26, wherein the hierarchical data is extensible markup language (XML) data.

32. A method for displaying hierarchical data in hypertext markup language (HTML) comprising:

building a first-level display for a first level of data in the hierarchical data the hierarchical data being expressed by a markup language, the first-level display having one or more actuatable subordinate data indicators that are displayed for each data item that has second-level data associated with it;

displaying the first-level display;

when a subordinate data indicator is actuated, building a second-level display for the second level of data in the hierarchical data that is associated with the data item corresponding to the subordinate data indicator that has been actuated; and displaying the second-level display.

33. The method as recited in claim 32, wherein the hierarchical data is extensible markup language (XML) data.

34. The method as recited in claim 32, further comprising:

including a second-level subordinate data indicator in the second-level display for each data item that has third-level data associated with it;

when a second-level subordinate data indicator is actuated, building a third-level display for the third level of data in the hierarchical data that is associated with the data item corresponding to the second-level subordinate data indicator that has been actuated; and displaying the third-level display.

35. The method as recited in claim 32, further comprising:

determining if the second-level display has been previously created; and creating the second-level display only if the second-level display has not previously been created.

36. The method as recited in claim 35, wherein the determining if the second-level display has been previously created further comprises referencing a data path that indicates whether the second-level display has been previously created.

37. The method as recited in claim 35, wherein the determining if the second-level display has been previously created further comprises referencing a data path that indicates whether the second-level display has previously been created, and wherein the method further comprises appending information to the data path when the second-level display is created if the second-level display has not previously been created, the information indicating that the second-level display has been created.

* * * * *